(12) United States Patent
Nakamura et al.

(10) Patent No.: US 9,887,592 B2
(45) Date of Patent: Feb. 6, 2018

(54) POWER TRANSMISSION DEVICE AND POWER RECEPTION DEVICE

(71) Applicant: Toyota Jidosha Kabushiki Kaisha, Toyota-shi Aichi-ken (JP)

(72) Inventors: Toru Nakamura, Toyota (JP); Nobuhisa Yamaguchi, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 82 days.

(21) Appl. No.: 15/130,315

(22) Filed: Apr. 15, 2016

(65) Prior Publication Data

US 2016/0308399 A1    Oct. 20, 2016

(30) Foreign Application Priority Data

Apr. 17, 2015   (JP) .................. 2015-084873

(51) Int. Cl.
| H01F 27/42 | (2006.01) |
| H01F 37/00 | (2006.01) |
| H01F 38/00 | (2006.01) |
| H02J 50/12 | (2016.01) |
| B60L 11/18 | (2006.01) |

(52) U.S. Cl.
CPC ............. *H02J 50/12* (2016.02); *B60L 11/182* (2013.01)

(58) Field of Classification Search
USPC ........................................... 307/104
See application file for complete search history.

(56) References Cited

U.S. PATENT DOCUMENTS

| 5,619,079 A * | 4/1997 | Wiggins ................. H02H 9/005 307/105 |
| 7,741,734 B2 | 6/2010 | Joannopoulos et al. |
| 2001/0045863 A1* | 11/2001 | Pelly ....................... H02M 1/12 327/552 |
| 2004/0109333 A1* | 6/2004 | D'Cunha ................ H02M 1/12 363/44 |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |

(Continued)

FOREIGN PATENT DOCUMENTS

| AU | 2006269374 B2 | 1/2007 |
| AU | 2007349874 A1 | 10/2008 |

(Continued)

*Primary Examiner* — Adam Houston
(74) *Attorney, Agent, or Firm* — Dinsmore & Shohl LLP (57) ABSTRACT

An AC line filter is connected to an enclosure serving as a ground. A power transmission unit is configured to transmit electric power to a power reception device in a contactless manner. An inverter is provided between the AC line filter and the power transmission unit. A common mode filter is provided between the inverter and the power transmission unit. A Y capacitor of the common mode filter is not connected to the enclosure, but is connected to a power line between the AC line filter and the inverter.

6 Claims, 6 Drawing Sheets

(56) References Cited

U.S. PATENT DOCUMENTS

| | | | |
|---|---|---|---|
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0025278 A1* | 2/2011 | Balakrishnan | H02M 1/32 320/166 |
| 2013/0051081 A1* | 2/2013 | Isono | H02M 1/126 363/15 |
| 2013/0127409 A1 | 5/2013 | Ichikawa | |
| 2013/0193749 A1 | 8/2013 | Nakamura et al. | |
| 2014/0074332 A1 | 3/2014 | Ichikawa et al. | |
| 2014/0112042 A1* | 4/2014 | Lee | H01F 27/29 363/125 |
| 2014/0140112 A1* | 5/2014 | Zhou | H02M 1/126 363/40 |
| 2014/0252946 A1* | 9/2014 | Fujita | H05B 33/0803 315/51 |
| 2015/0003125 A1* | 1/2015 | Lee | H02H 9/005 363/44 |
| 2015/0008877 A1 | 1/2015 | Ichikawa et al. | |
| 2015/0171667 A1 | 6/2015 | Kai et al. | |
| 2015/0364989 A1* | 12/2015 | Chung | H02M 1/12 363/44 |
| 2016/0080036 A1* | 3/2016 | Su | H04B 3/548 363/44 |
| 2016/0270161 A1* | 9/2016 | Malyna | H05B 33/0884 |
| 2016/0308399 A1* | 10/2016 | Nakamura | H02J 50/12 |
| 2016/0378052 A1* | 12/2016 | Kosaka | G03G 15/2039 399/88 |
| 2017/0163145 A1* | 6/2017 | Cheng | H02M 1/12 |
| 2017/0237333 A1* | 8/2017 | Wang | H02M 1/12 363/44 |
| 2017/0237334 A1* | 8/2017 | Kawashima | H02M 1/12 363/44 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| CN | 102520722 A | 6/2012 |
| CN | 101789637 B | 1/2013 |
| CN | 104201920 A | 12/2014 |
| CN | 104508945 A | 4/2015 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2008-067534 A | 3/2008 |
| JP | 2009-501510 T | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-054095 A | 3/2014 |
| JP | 2015-065756 A | 4/2015 |
| KR | 20080031398 A | 4/2008 |
| KR | 20100015954 A | 2/2010 |
| WO | 2007008646 A2 | 1/2007 |
| WO | 2008118178 A1 | 10/2008 |

* cited by examiner

POWER TRANSMISSION DEVICE AND POWER RECEPTION DEVICE

CROSS-REFERENCE TO RELATED APPLICATIONS

This nonprovisional application claims priority to Japanese Patent Application No. 2015-084873 filed on Apr. 17, 2015, with the Japan Patent Office, the entire contents of which are hereby incorporated by reference.

BACKGROUND

Technical Field

The present disclosure relates to power transmission devices and power reception devices, and more particularly to a power transmission device and a power reception device used in a power transfer system in which electric power is transferred from the power transmission device to the power reception device in a contactless manner.

Description of the Background Art

Japanese Patent Laying-Open No. 2014-54095 discloses a contactless power feeding system in which electric power is supplied from a power transmission device to a vehicle in a contactless manner. In this contactless power feeding system, the power transmission device and a power reception device (vehicle) are each provided with a matching box. In the power transmission device, the input impedance of a power transmission unit is adjusted by the matching box. In the power reception device, the input impedance of a load is adjusted by the matching box (see Japanese Patent Laying-Open No. 2014-54095).

A power transmission device used in a contactless power transfer system typically includes an AC (Alternate Current) line filter provided on an AC power line connected to an AC power supply (system power supply, for example), an inverter for generating high-frequency electric power to be transmitted, a power transmission coil for transmitting electric power to a power reception coil of a power reception device in a contactless manner through an electromagnetic field, and a normal mode filter provided between the inverter and the power transmission coil. The AC line filter is connected to a ground such as a conductive enclosure. The normal mode filter is typically an LC filter. Each of the matching boxes described in Japanese Patent Laying-Open No. 2014-54095 is formed of an LC circuit, and also functions as a normal mode filter.

In such a power transmission device, a common mode current (high-frequency noise) originating from the inverter may pass between the power transmission coil and the enclosure through a parasitic capacitance formed between the power transmission coil and the conductive enclosure (ground). With the AC line filter being connected to the enclosure (ground), a loop of common mode current is formed which passes through the inverter, the power transmission coil, the parasitic capacitance, the enclosure (ground) and the AC line filter.

When the power transmission coil is included in the loop of common mode current, the high-frequency noise is emitted from the power transmission coil. In such a power transmission device, therefore, it is conceivable to provide a common mode filter between the inverter and the power transmission coil, and connect a Y capacitor (also referred to as a line bypass capacitor) of the common mode filter to the enclosure (ground).

With this circuit configuration, the emission of the high-frequency noise from the power transmission coil can be reduced. However, even with this circuit configuration, the high-frequency noise emitted from the enclosure (ground) through the AC line filter to the AC power supply may not be reduced to a sufficient degree.

Such conditions may occur in the power reception device as well. The power reception device typically includes a power reception coil for receiving electric power from the power transmission coil of the power transmission device in a contactless manner, a rectifier for rectifying the electric power received by the power reception coil, and a DC (Direct Current) filter provided on a DC power line at the output side of the rectifier. The DC filter is connected to a ground such as a conductive enclosure. Since the rectifier generates high-frequency noise, it is conceivable to provide a common mode filter between the rectifier and the power reception coil, and connect a Y capacitor of the common mode filter to the enclosure (ground), so as to suppress the emission of the high-frequency noise from the power reception coil.

With this circuit configuration, the emission of the high-frequency noise from the power reception coil can be reduced. However, even with this circuit configuration, the high-frequency noise emitted from the enclosure (ground) through the DC filter to a load connected to the DC power line may not be reduced to a sufficient degree.

SUMMARY

The present disclosure has been made to solve the aforementioned problems, and an object of the present disclosure is to suppress the emission of high-frequency noise from a power transmission coil, and to suppress the emission of high-frequency noise to an AC power supply through an AC line filter connected to a ground, in a power transmission device that transmits electric power to a power reception device in a contactless manner.

Another object of the present disclosure is to suppress the emission of high-frequency noise from a power reception coil, and to suppress the emission of high-frequency noise to a load through a DC filter connected to a ground, in a power reception device that receives electric power from a power transmission device in a contactless manner.

According to the present disclosure, a power transmission device includes an AC line filter, an inverter, a power transmission coil, and a common mode filter. The AC line filter is provided on an AC power line connected to an AC power supply, and connected to a ground. The inverter converts electric power supplied from the AC power supply through the AC line filter into electric power to be transmitted. The power transmission coil is electrically connected to the inverter, and configured to receive from the inverter the electric power to be transmitted and transmit the electric power to a power reception coil of a power reception device in a contactless manner. The common mode filter is provided on a power line between the inverter and the power transmission coil. The common mode filter includes a first Y capacitor. The first Y capacitor is not connected to the ground, but is connected to a power line between the AC line filter and the inverter.

In some embodiments, the power transmission device further includes a rectifier circuit. The rectifier circuit is electrically connected between the AC line filter and the inverter. The first Y capacitor is connected to a DC power line between the rectifier circuit and the inverter.

In some embodiments, the rectifier circuit is a power factor correction circuit.

With this configuration, a common mode current does not flow from the common mode filter to the ground, but flows to the power line between the AC line filter and the inverter. According to this power transmission device, therefore, the emission of high-frequency noise to the AC power supply through the AC line filter connected to the ground can be suppressed. In addition, since the first Y capacitor is not connected to the ground, a high level of electrical safety is not required of the first Y capacitor, so that the performance required of the first Y capacitor can be dedicated to the suppression of high-frequency noise. As a result, cost reduction of the common mode filter can be realized.

In some embodiments, the power transmission device further includes a second Y capacitor. The second Y capacitor is provided on the DC power line and connected to the ground.

With this configuration, propagation of noise generated in the rectifier circuit (power factor correction circuit) to circuits subsequent to the inverter can be suppressed.

According to the present disclosure, a power reception device includes a power reception coil, a rectifier, a DC filter, and a common mode filter. The power reception coil is configured to receive electric power from a power transmission coil of a power transmission device in a contactless manner. The rectifier is configured to rectify the electric power received by the power reception coil. The DC filter is provided on a power line to which the electric power rectified by the rectifier is output, and connected to a ground. The common mode filter is provided on a power line between the power reception coil and the rectifier. The common mode filter includes a first Y capacitor. The first Y capacitor is not connected to the ground, but is connected to a power line between the rectifier and the DC filter.

With this configuration, a common mode current does not flow from the common mode filter to the ground, but flows to the power line between the rectifier and the DC filter. According to this power reception device, therefore, the emission of high-frequency noise to a load through the DC filter connected to the ground can be suppressed. In addition, since the first Y capacitor is not connected to the ground, a high level of electrical safety is not required of the first Y capacitor, so that the performance required of the first Y capacitor can be dedicated to the suppression of high-frequency noise. As a result, cost reduction of the common mode filter can be realized.

In some embodiments, the power reception device further includes a second Y capacitor. The second Y capacitor is provided on the power line between the rectifier and the DC filter and connected to the ground.

With this configuration, noise generated in the power line between the rectifier and the DC filter can be effectively suppressed.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Embodiments of the present disclosure will hereinafter be described in detail with reference to the drawings. Although a plurality of embodiments will be described below, it is originally planned to appropriately combine configurations described in the embodiments. In the drawings, the same or corresponding parts are designated by the same characters and a description thereof will not be repeated.

First Embodiment

Figure 1:
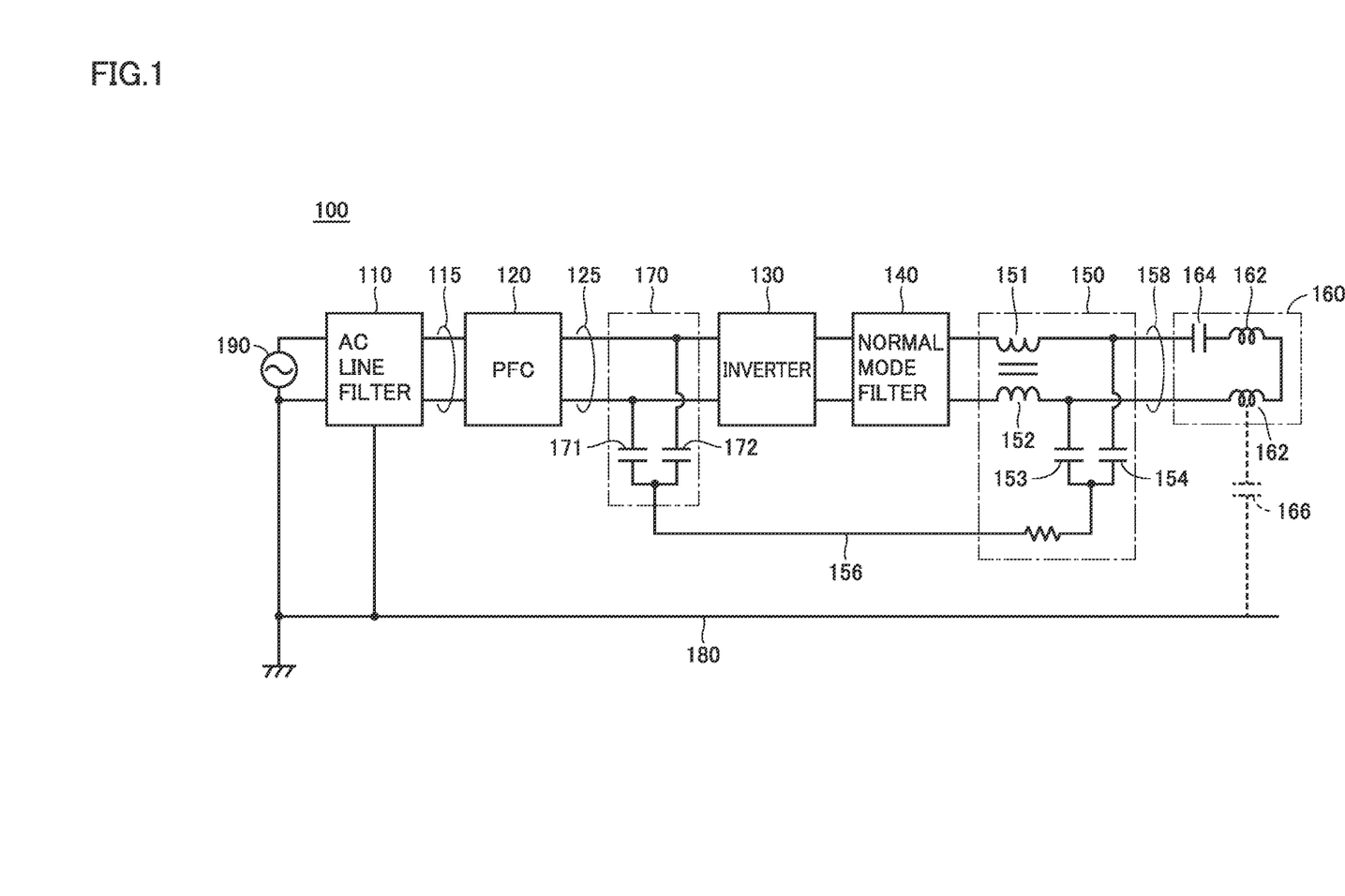
FIG. 1 is a diagram showing a circuit configuration of a power transmission device in accordance with a first embodiment.

FIG. 1 is a diagram showing a circuit configuration of a power transmission device in accordance with a first embodiment of the present disclosure. Referring to FIG. 1, a power transmission device 100 includes an AC line filter 110, a power factor correction (PFC) circuit 120, an inverter 130, a normal mode filter 140, a common mode filter 150, a power transmission unit 160, and an enclosure 180.

AC line filter 110 is provided on AC power lines 115 receiving electric power from an AC power supply 190 (system power supply, for example), and removes noise contained in AC power supply 190 as well as noise generated by the power transmission device. AC line filter 110 is connected to conductive enclosure 180 functioning as a ground, and passes the noise contained in AC power supply 190 to enclosure 180. A variety of known AC line filters may be employed as AC line filter 110.

PFC circuit 120 rectifies AC power received from AC power lines 115 and supplies the power to inverter 130, and can correct the power factor by bringing input current closer to a sinusoidal wave. A variety of known PFC circuits may be employed as this PFC circuit 120 as well. A rectifier not having power factor correction capability may be employed instead of PFC circuit 120.

Inverter 130 converts DC power received from PFC circuit 120 into electric power to be transmitted (AC) having a prescribed power transmission frequency. Inverter 130 is formed of, for example, a single-phase bridge circuit.

Normal mode filter 140 is provided between inverter 130 and power transmission unit 160, and removes normal mode noise generated in inverter 130. Normal mode filter 140 is formed of, for example, an LC filter including a coil provided on one or both of the pair of power lines, and a capacitor provided between the pair of power lines.

Common mode filter 150 is also provided between inverter 130 and power transmission unit 160, and removes common mode noise generated in inverter 130. Although common mode filter 150 is provided between normal mode filter 140 and power transmission unit 160 in this FIG. 1, common mode filter 150 may be provided between inverter 130 and normal mode filter 140.

Common mode filter 150 includes choke coils 151, 152 and Y capacitors 153, 154. Choke coils 151, 152 are wound in opposite directions on a ring-shaped ferrite core, for example. If the common mode noise can be removed to a sufficient degree by Y capacitors 153, 154, choke coils 151, 152 may be eliminated.

Y capacitors 153, 154 are connected to one and the other of a pair of power lines 158, respectively, and have terminals connected together at the opposite side to the ends connected to the pair of power lines 158. While the connected ends of Y capacitors are generally connected to a ground (enclosure 180), in power transmission device 100 in accordance with this first embodiment, Y capacitors 153, 154 are not connected to enclosure 180 (wound), and are connected to DC power lines 125 at the input side of inverter 130 through a power line 156, and a circuit 170 including capacitors 171, 172.

DC power lines 125 are generally provided with a smoothing filter between the pair of power lines. Thus, if the smoothing filter is formed of two capacitors connected in series, power line 156 may be connected to a midpoint between the two capacitors. In this case, it is unnecessary to separately provide circuit 170 (capacitors 171, 172). If the capacitors of the smoothing filter can remove noise components to a sufficient degree, power line 156 may be connected to one (positive line or negative line) of the pair of power lines provided with the smoothing filter, even if the capacitors of the smoothing filter have a configuration without the midpoint such as described above.

Power transmission unit 160 includes a coil 162 and a capacitor 164. Coil 162 and capacitor 164 form a resonant circuit. Power transmission unit 160 receives the AC power having the power transmission frequency from inverter 130, and transmits the electric power to a power reception unit of a power reception device which is not shown in a contactless manner, through an electromagnetic field formed around coil 162. Although capacitor 164 is connected in series with coil 162 in this FIG. 1, capacitor 164 may be connected in parallel with coil 162.

Enclosure 180 is made of a conductive member, and is, for example, an enclosure made of metal such as aluminum. Enclosure 180 functions as a ground of power transmission device 100, and AC line filter 110 is connected to enclosure 180 as described above.

In power transmission device 100 in accordance with this first embodiment, common mode filter 150 is provided between inverter 130 and power transmission unit 160. Y capacitors 153, 154 of common mode filter 150 are not connected to enclosure 180 serving as a ground, and are connected to DC power lines 125 at the input side of inverter 130. The reason that such a configuration is adopted in this first embodiment will now be described.

Figure 2:
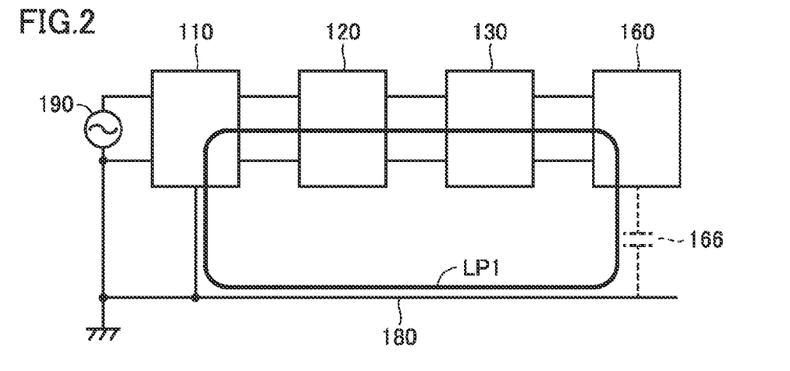
FIG. 2 is a diagram showing, as a first reference example, a path of common mode current when the power transmission device is not provided with a common mode filter.

FIG. 2 is a diagram showing, as a first reference example, a path of common mode current when the power transmission device is not provided with the common mode filter. It is noted that the illustration of normal mode filter 140 is omitted in this FIG. 2 and the subsequent FIGS. 3 and 4 which will be described for comparison.

Referring to FIG. 2, a parasitic capacitance 166 is formed between a power transmission coil of power transmission unit 160 and enclosure 180 (ground), and a common mode current may pass between power transmission unit 160 and enclosure 180 through this parasitic capacitance 166. With AC line filter 110 being connected to enclosure 180 serving as a ground, a loop LP1 of common mode current is formed which passes through inverter 130, power transmission unit 160, parasitic capacitance 166, enclosure 180, AC line filter 110 and PFC circuit 120.

When power transmission unit 160 (power transmission coil) is included in the path through which the common mode current flows, high-frequency noise (common mode noise) is emitted from power transmission unit 160 to the outside. It is then conceivable to provide common mode filter 150 between inverter 130 and power transmission unit 160.

Figure 3:
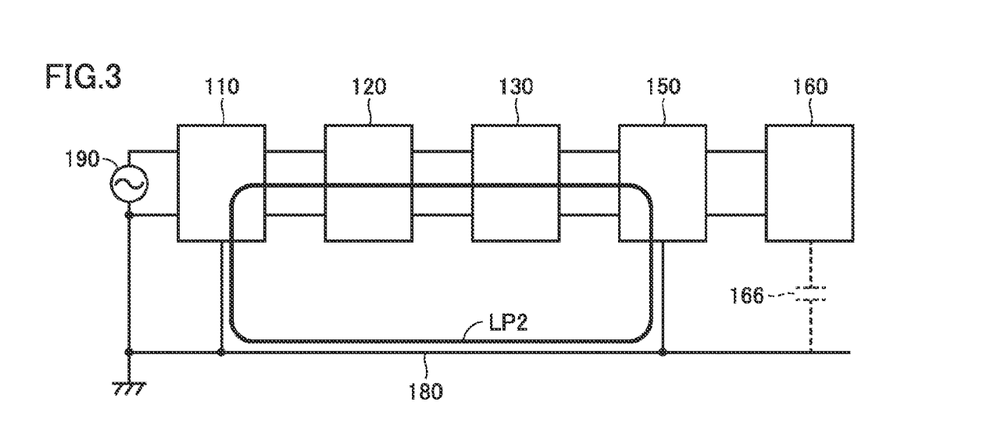
FIG. 3 is a diagram showing, as a second reference example, a path of common mode current when the power transmission device is provided with a common mode filter and the common mode filter is connected to an enclosure.

FIG. 3 is a diagram showing, as a second reference example, a path of common mode current when the power transmission device is provided with common mode filter 150 and common mode filter 150 is connected to enclosure 180.

Referring to FIG. 3, by providing common mode filter 150 connected to enclosure 180 serving as a ground, a loop LP2 of common mode current is formed which passes through inverter 130, common mode filter 150, enclosure 180, AC line filter 110 and PFC circuit 120. Thereby, the flow of the common mode current to power transmission unit 160 can be suppressed. However, the common mode current flows to enclosure 180, which may cause the emission of the common mode current from enclosure 180 to AC power supply 190 through AC line filter 110.

Figure 4:
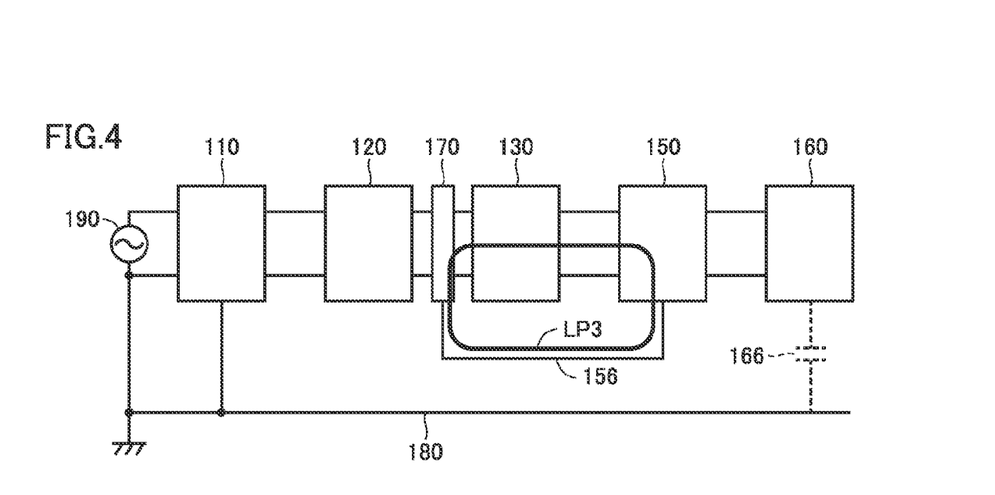
FIG. 4 is a diagram showing a path of common mode current in the power transmission device in accordance with the first embodiment.

FIG. 4 is a diagram showing a path of common mode current in power transmission device 100 in accordance with this first embodiment. Referring to FIG. 4, in power transmission device 100 in accordance with this first embodiment, common mode filter 150 is not connected to enclosure 180 serving as a ground as described above, and is connected to the DC power lines between PFC circuit 120 and inverter 130 by power line 156. With this circuit configuration, a loop LP3 of common mode current is formed which passes through inverter 130, common mode filter 150, power line 156 and circuit 170 (capacitors 171, 172 in FIG. 1).

With this configuration, the common mode current can be confined to a small area along loop LP3, thus preventing the common mode current from flowing to power transmission unit 160 and also from flowing to enclosure 180 serving as a ground. According to power transmission device 100 in accordance with this first embodiment, therefore, the emission of the common mode current (high-frequency noise) from enclosure 180 to AC power supply 190 through AC line filter 110 can be suppressed.

Furthermore, since common mode filter 150 is not connected to enclosure 180 serving as a ground, a high level of electrical safety is not required of Y capacitors 153, 154 of common mode filter 150 (FIG. 1), so that the performance required of Y capacitors 153, 154 can be dedicated to the suppression of high-frequency noise. According to this first embodiment, therefore, cost reduction of common mode filter 150 can also be realized.

Although Y capacitors 153, 154 of common mode filter 150 are connected to DC power lines 125 between PFC circuit 120 and inverter 130 (FIG. 1) through power line 156 in the above description, Y capacitors 153, 154 may be connected to AC power lines 115 between AC line filter 110 and PFC circuit 120 (FIG. 1). Also with this configuration, a function and effect similar to that of the first embodiment described above can be provided.

Second Embodiment

Figure 5:
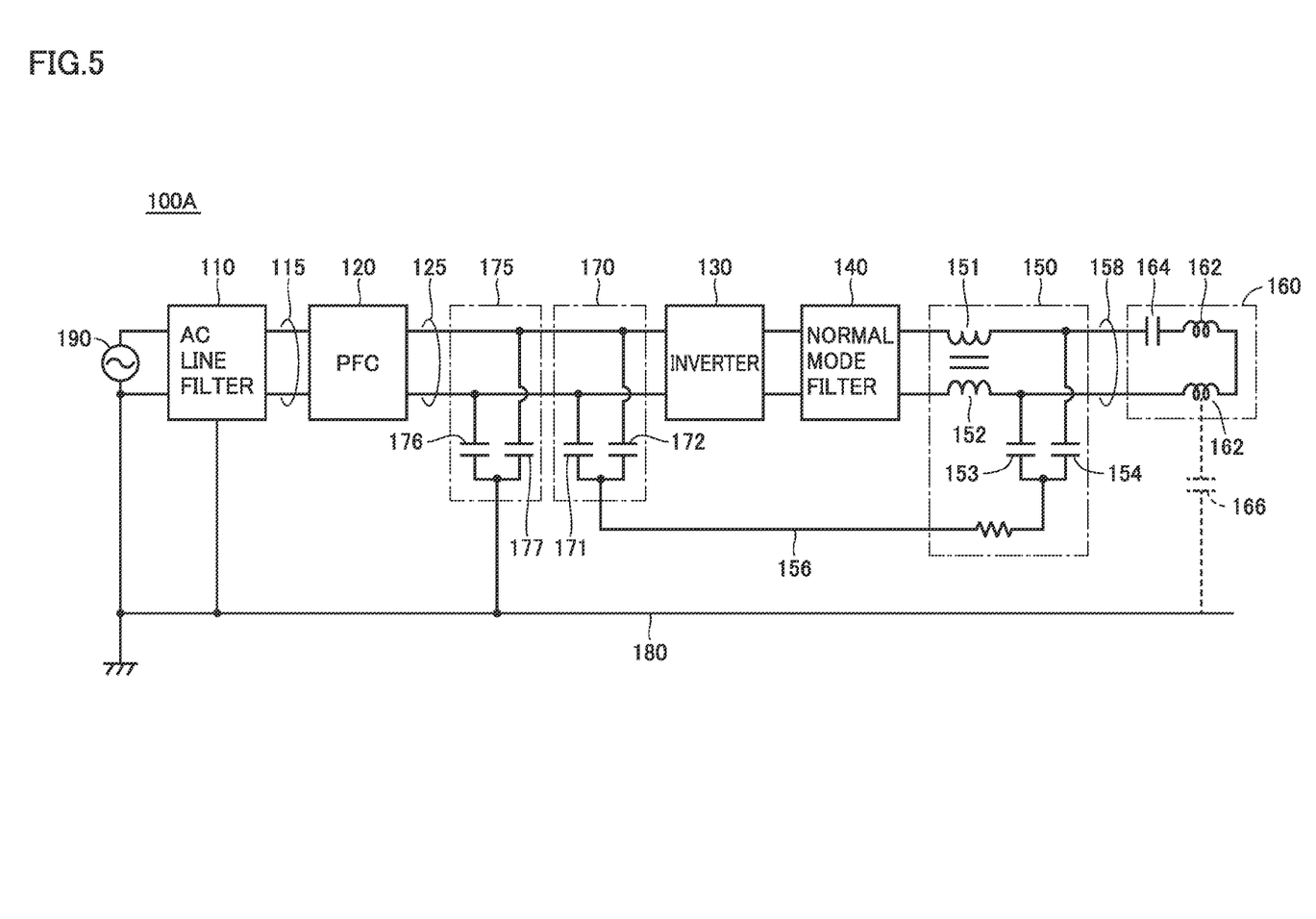
FIG. 5 is a diagram showing a circuit configuration of a power transmission device in accordance with a second embodiment.

FIG. 5 is a diagram showing a circuit configuration of a power transmission device in accordance with a second embodiment. Referring to FIG. 5, this power transmission device 100A further includes a circuit 175 in the configuration of power transmission device 100 in accordance with the first embodiment shown in FIG. 1.

Circuit 175 is provided on DC power lines 125 between PFC circuit 120 and inverter 130, and includes Y capacitors 176, 177. Y capacitors 176, 177 are connected to one and the other of DC power lines 125, respectively, and have terminals connected to enclosure 180 serving as a ground at the opposite side to the ends connected to DC power lines 125. Since Y capacitors 176, 177 are connected to enclosure 180 serving as a ground, a high level of electrical safety is required of Y capacitors 176, 177. The configuration of power transmission device 100A is otherwise the same as that of power transmission device 100 shown in FIG. 1.

By providing Y capacitors 176, 177 on DC power lines 125 between PFC circuit 120 and inverter 130 in this manner, propagation of high-frequency noise generated in PFC circuit 120 to circuits subsequent to inverter 130 can be suppressed.

While it may be conceivable to provide Y capacitors 176, 177 on power lines 115 between AC line filter 110 and PFC circuit 120, in that case, the common mode current may flow to PFC circuit 120. This may result in malfunction, power factor degradation and the like of PFC circuit 120. In some embodiments, Y capacitors 176, 177 are provided on DC power lines 125 between PFC circuit 120 and inverter 130, as shown in FIG. 5.

Third Embodiment

While the circuit configuration of the power transmission device has been illustrated in the first and second embodiments described above, a circuit configuration of a power reception device will be illustrated in this third embodiment and a fourth embodiment to be described later.

Figure 6:
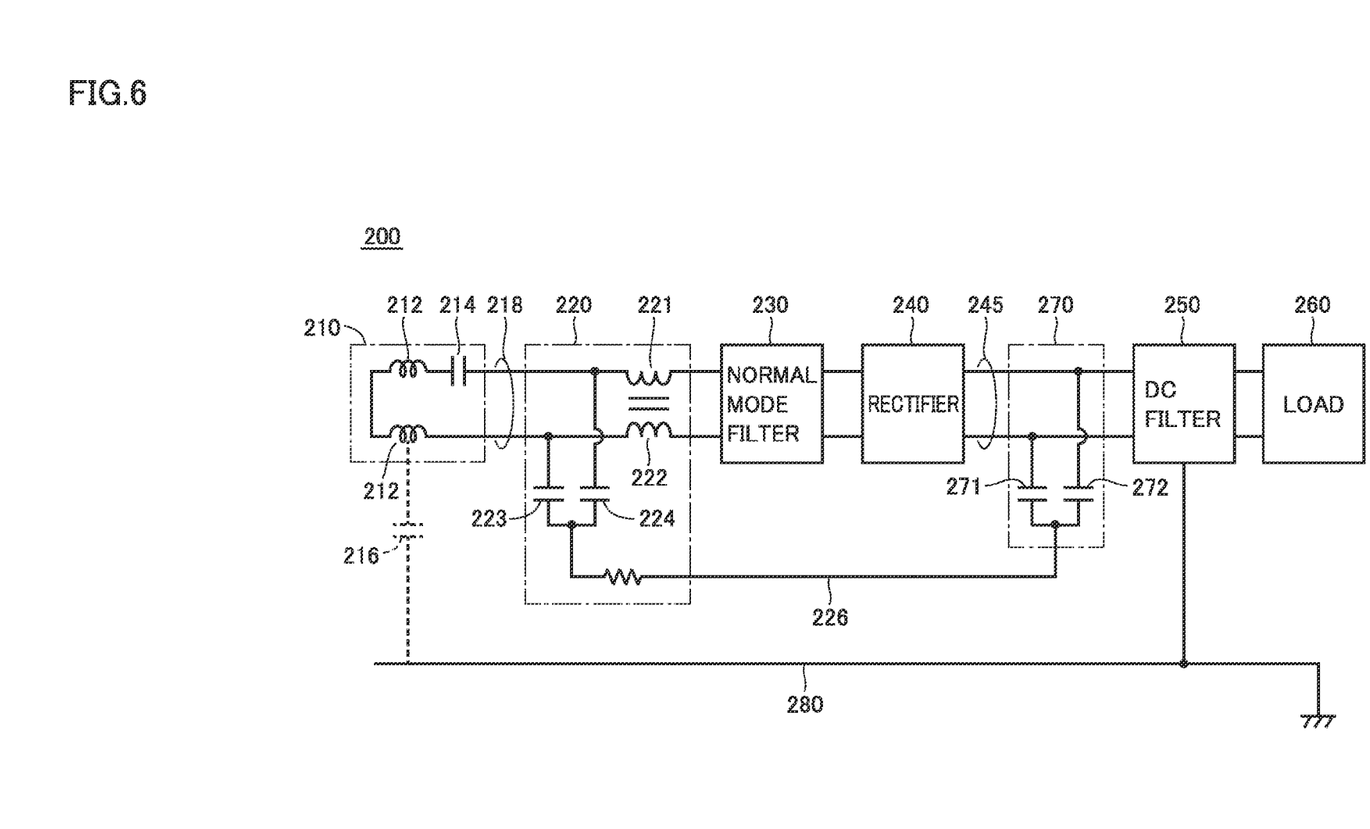
FIG. 6 is a diagram showing a circuit configuration of a power reception device in accordance with a third embodiment.

FIG. 6 is a diagram showing a circuit configuration of a power reception device in accordance with the third embodiment. Referring to FIG. 6, a power reception device 200 includes a power reception unit 210, a common mode filter 220, a normal mode filter 230, a rectifier 240, a DC filter 250, and an enclosure 280.

Power reception unit 210 includes a coil 212 and a capacitor 214. Coil 212 and capacitor 214 form a resonant circuit. Power reception unit 210 receives in a contactless manner electric power (AC) transmitted from a power transmission unit of a power transmission device which is not shown through an electromagnetic field, and outputs the electric power to power lines 218. Although capacitor 214 is connected in series with coil 212 in this FIG. 6, capacitor 214 may be connected in parallel with coil 212.

Common mode filter 220 is provided between power reception unit 210 and rectifier 240, and removes common mode noise in power reception device 200. Common mode filter 220 includes choke coils 221, 222 and Y capacitors 223, 224. Choke coils 221, 222 are wound in opposite directions on a ring-shaped ferrite core, for example. If the common mode noise can be removed to a sufficient degree by Y capacitors 223, 224, choke coils 221, 222 may be eliminated.

Y capacitors 223, 224 are connected to one and the other of the pair of power lines 218, respectively, and have terminals connected together at the opposite side to the ends connected to the pair of power lines 218. Y capacitors 223, 224 are not connected to enclosure 280 (ground), and are connected to DC power lines 245 at the output side of rectifier 240 through a power line 226, and a circuit 270 including capacitors 271, 272.

DC power lines 245 are generally provided with a smoothing filter between the pair of power lines. Thus, if the smoothing filter is formed of two capacitors connected in series, power line 226 may be connected to a midpoint between the two capacitors. In this case, it is unnecessary to separately provide circuit 270 (capacitors 271, 272).

Normal mode filter 230 is also provided between power reception unit 210 and rectifier 240, and removes normal mode noise in power reception device 200. Normal mode filter 230 is formed of, for example, an LC filter including a coil provided on one or both of the pair of power lines, and a capacitor provided between the pair of power lines. Although normal mode filter 230 is provided between common mode filter 220 and rectifier 240 in this FIG. 6, normal mode filter 230 may be provided between power reception unit 210 and common mode filter 220.

Rectifier 240 rectifies the electric power (AC) received by power reception unit 210 and outputs the electric power to a load 260 (battery, for example). Rectifier 240 is formed of, for example, a static circuit including a diode bridge and a smoothing capacitor, a switching regulator that performs rectification using a switching element, and the like.

DC filter 250 is provided on DC power lines 245 to which the electric power rectified by rectifier 240 is output, and suppresses the emission of noise to load 260 connected to DC power lines 245. DC filter 250 is connected to conductive enclosure 280 functioning as a ground, and passes the noise contained in DC power lines 245 to enclosure 280. A variety of known DC filters may be employed as DC filter 250.

Enclosure 280 is made of a conductive member, and is, for example, an enclosure made of metal such as aluminum. Enclosure 280 functions as a ground of power reception device 200, and DC filter 250 is connected to enclosure 280 as described above.

In power reception device 200 in accordance with this third embodiment, common mode filter 220 is provided between power reception unit 210 and rectifier 240. Y capacitors 223, 224 of common mode filter 220 are not connected to enclosure 280 serving as a ground, and are connected to DC power lines 245 at the output side of rectifier 240. The reason that such a configuration is adopted in this third embodiment will now be described.

Figure 7:
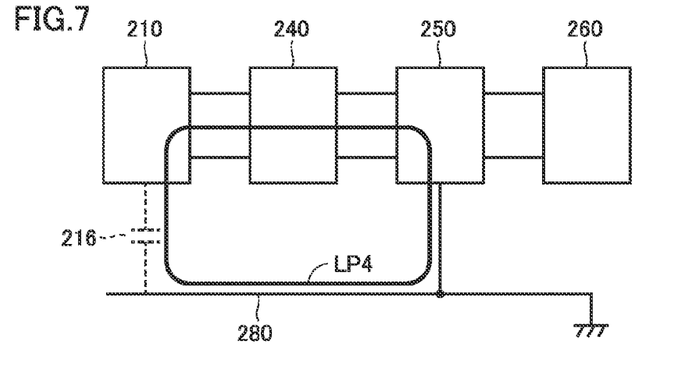
FIG. 7 is a diagram showing, as a third reference example, a path of common mode current when the power reception device is not provided with a common mode filter.

FIG. 7 is a diagram showing, as a third reference example, a path of common mode current when the power reception device is not provided with the common mode filter. It is noted that the illustration of normal mode filter 230 is omitted in this FIG. 7 and the subsequent FIGS. 8 and 9 which will be described for comparison.

Referring to FIG. 7, a parasitic capacitance 216 is formed between a power reception coil of power reception unit 210 and enclosure 280 (ground), and a common mode current may pass between power reception unit 210 and enclosure 280 through this parasitic capacitance 216. With DC filter 250 being connected to enclosure 280 serving as a ground, a loop LP4 of common mode current is formed which passes through rectifier 240, power reception unit 210, parasitic capacitance 216, enclosure 280 and DC filter 250.

When power reception unit 210 (power reception coil) is included in the path through which the common mode current flows, 11:01 -frequency noise is emitted from power reception unit 210 to the outside. It is then conceivable to provide common mode filter 220 between power reception unit 210 and rectifier 240.

Figure 8:
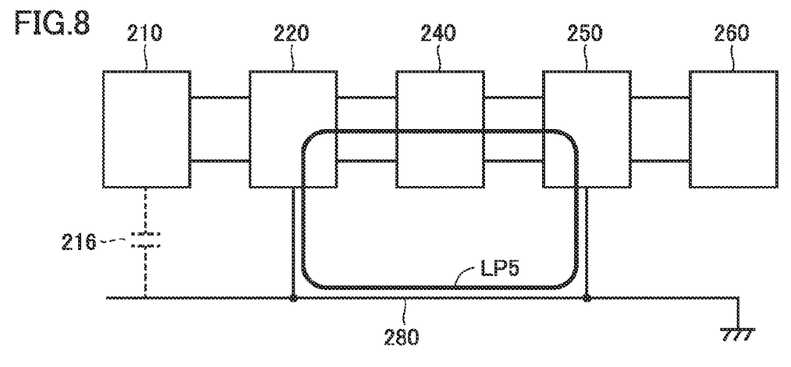
FIG. 8 is a diagram showing, as a fourth reference example, a path of common mode current when the power transmission device is provided with a common mode filter and the common mode filter is connected to an enclosure.

FIG. 8 is a diagram showing, as a fourth reference example, a path of common mode current when the power reception device is provided with common mode filter 220 and common mode filter 220 is connected to enclosure 280.

Referring to FIG. 8, by providing common mode filter 220 connected to enclosure 280 serving as a ground, a loop LP5 of common mode current is formed which passes through rectifier 240, common mode filter 220, enclosure 280 and DC filter 250. Thereby, the flow of the common mode current to power reception unit 210 can be suppressed. However, the common mode current flows to enclosure 280, which may cause the emission of the common mode current from enclosure 280 to load 260 through DC filter 250.

Figure 9:
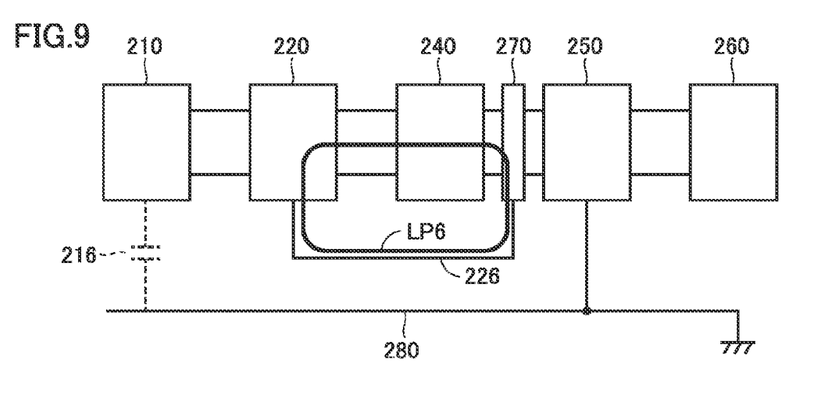
FIG. 9 is a diagram showing a path of common mode current in the power reception device in accordance with the third embodiment.

FIG. 9 is a diagram showing a path of common mode current in power reception device 200 in accordance with this third embodiment. Referring to FIG. 9, in power reception device 200 in accordance with this third embodiment, common mode filter 220 is not connected to enclosure 280 serving as a ground as described above, and is connected to the DC power lines between rectifier 240 and DC filter 250 by power line 226. With this circuit configuration, a loop LP6 of common mode current is formed which passes through rectifier 240, common mode filter 220, power line 226 and circuit 270 (capacitors 271, 272 in FIG. 6).

With this configuration, the common mode current can be confined to a small area along loop LP6, thus preventing the common mode current from flowing to power reception unit 210 and also from flowing to enclosure 280 serving as a ground. According to power reception device 200 in accordance with this third embodiment, therefore, the emission of the common mode current (high-frequency noise) from enclosure 280 to load 260 through DC filter 250 can be suppressed.

In addition, since common mode filter 220 is not connected to enclosure 280 serving as a ground, a high level of electrical safety is not required of Y capacitors 223, 224 of common mode filter 220 (FIG. 6), so that the performance required of Y capacitors 223, 224 can be dedicated to the suppression of high-frequency noise. According to this third embodiment, therefore, cost reduction of common mode filter 220 can also be realized.

Fourth Embodiment

Figure 10:
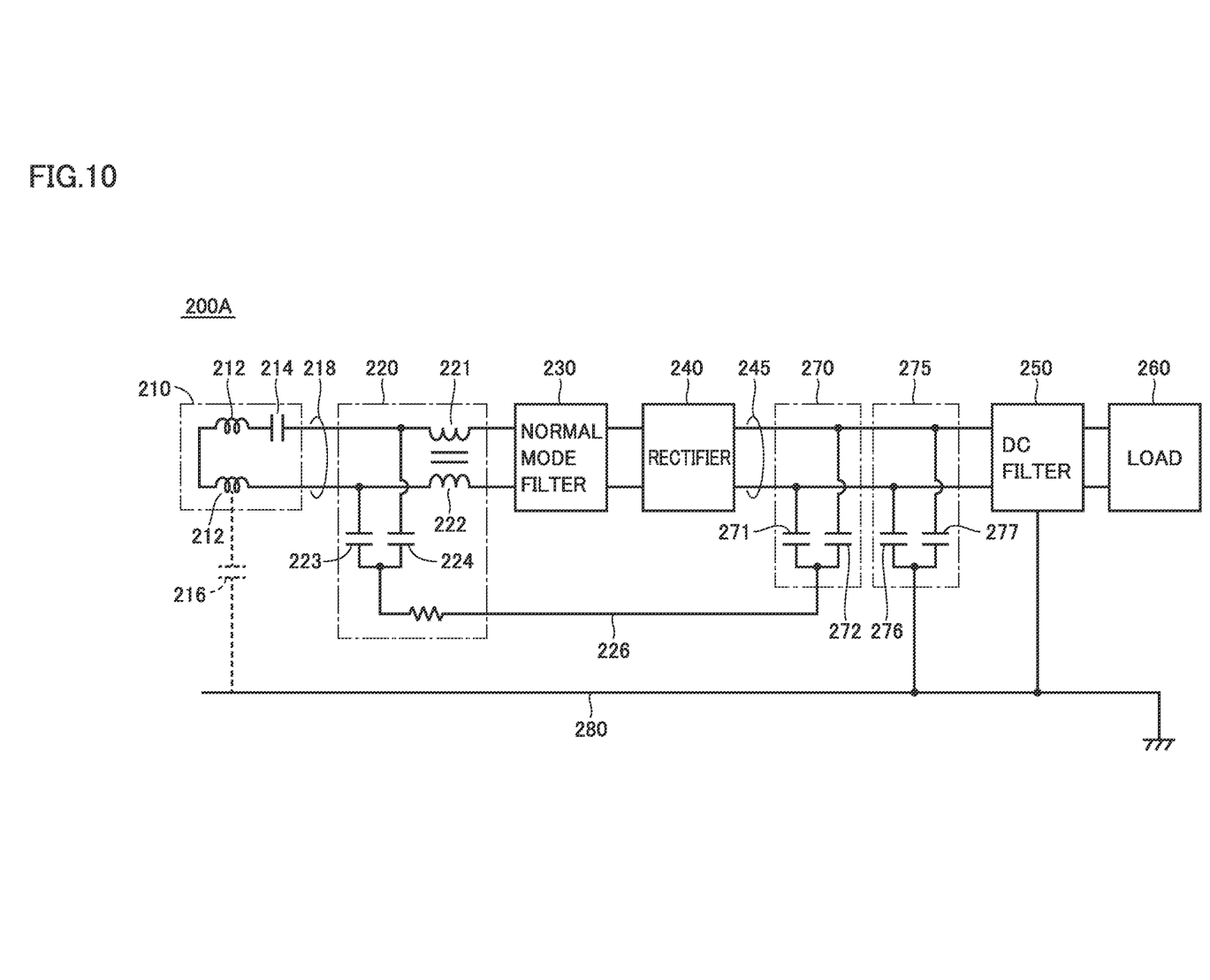
FIG. 10 is a diagram showing a circuit configuration of a power reception device in accordance with a fourth embodiment.

FIG. 10 is a diagram showing a circuit configuration of a power reception device in accordance with a fourth embodiment. Referring to FIG. 10, this power reception device 200A further includes a circuit 275 in the configuration of power reception device 200 in accordance with the third embodiment shown in FIG. 6.

Circuit 275 is provided on DC power lines 245 between rectifier 240 and DC filter 250, and includes Y capacitors 276, 277. Y capacitors 276, 277 are connected to one and the other of DC power lines 245, respectively, and have terminals connected to enclosure 280 serving as a ground at the opposite side to the ends connected to DC power lines 245. Since Y capacitors 276, 277 are connected to enclosure 280 serving as a ground, a high level of electrical safety is required of Y capacitors 276, 277. The configuration of power reception device 200A is otherwise the same as that of power reception device 200 shown in FIG. 6.

By providing Y capacitors 276, 277 on DC power lines 245 between rectifier 240 and DC filter 250 in this manner, the common mode noise generated in DC power lines 245 can be effectively suppressed.

Although one common mode filter and one normal mode filter are provided in each of the embodiments described above, the common mode filter and/or the normal mode filter may be configured to have multiple stages, or the common mode filter may be configured such that it is sandwiched between a plurality of normal mode filters. If a plurality of common mode filters are provided, it is only required that only one of the plurality of common mode filters be connected to the power lines between AC line filter 110 and inverter 130 in the power transmission device, and that only one of the plurality of common mode filters be connected to the power lines between rectifier 240 and DC filter 250 in the power reception device.

Moreover, in each of the embodiments described above, a resistive element may be connected in series or in parallel with the Y capacitors. The circuit diagram of each of the embodiments described above shows, as an example, a resistive element connected in series with the Y capacitors of the common mode filter. By providing such a resistive element, a damping effect can be imparted to noise attenuation characteristics by the Y capacitors, thereby preventing lowering of attenuation effect at a specified frequency.

In the first and second embodiments described above, a member such as a shield of power transmission unit 160 may be used also as power line 156. In the third and fourth embodiments, too, a member such as a shield of power reception unit 210 may be used also as power line 226. This can eliminate the need for new wires to realize cost and size reductions of the device, in addition, the inductance of wires can be reduced, thereby providing a greater effect of reducing the noise.

In the above description, enclosure 180 corresponds to an example of "ground" in the present disclosure of the power transmission device, and Y capacitors 153, 154 correspond to an example of "first Y capacitor" in the present disclosure of the power transmission device. PFC circuit 120 corresponds to an example of "rectifier circuit" in the present disclosure of the power transmission device, and Y capacitors 176, 177 correspond to an example of "second Y capacitor" in the present disclosure of the power transmission device.

Further, enclosure 280 corresponds to an example of "ground" in the present disclosure of the power reception device, and Y capacitors 223, 224 correspond to an example of "first Y capacitor" in the present disclosure of the power reception device. Furthermore, Y capacitors 276, 277 correspond to an example of "second Y capacitor" in the present disclosure of the power reception device.

Although the embodiments of the present disclosure have been described above, it should be understood that the embodiments disclosed herein are illustrative and non-restrictive in every respect. The scope of the present disclosure is defined by the terms of the claims, and is intended to include any modifications within the scope and meaning equivalent to the terms of the claims.

What is claimed is:
1. A power transmission device comprising:
an AC line filter provided on an AC power line connected to an AC power supply, and connected to a ground;

an inverter configured to convert electric power supplied from the AC power supply through the AC line filter into electric power to be transmitted;

a power transmission coil electrically connected to the inverter, and configured to receive from the inverter the electric power to be transmitted and transmit the electric power to a power reception coil of a power reception device in a contactless manner; and a common mode filter provided on a power line between the inverter and the power transmission coil, the common mode filter including a first Y capacitor, the first Y capacitor not being connected to the ground, but being connected to a power line between the AC line filter and the inverter.

2. The power transmission device according to claim 1, further comprising a rectifier circuit electrically connected between the AC line filter and the inverter, wherein the first Y capacitor is connected to a DC power line between the rectifier circuit and the inverter.

3. The power transmission device according to claim 2, wherein the rectifier circuit is a power factor correction circuit.

4. The power transmission device according to claim 2, further comprising a second Y capacitor provided on the DC power line and connected to the ground.

5. A power reception device comprising:

a power reception coil configured to receive electric power from a power transmission coil of a power transmission device in a contactless manner;

a rectifier configured to rectify the electric power received by the power reception coil;

a DC filter provided on a power line to which the electric power rectified by the rectifier is output, and connected to a ground; and a common mode filter provided on a power line between the power reception coil and the rectifier.

the common mode filter including a first Y capacitor, the first Y capacitor not being connected to the ground, but being connected to a power line between the rectifier and the DC filter.

6. The power reception device according to claim 5, further comprising a second Y capacitor provided on the power line between the rectifier and the DC filter and connected to the ground.

* * * * *

UNITED STATES PATENT AND TRADEMARK OFFICE
CERTIFICATE OF CORRECTION

Page 1 of 1

PATENT NO.         : 9,887,592 B2
APPLICATION NO.    : 15/130315
DATED              : February 6, 2018
INVENTOR(S)        : Toru Nakamura and Nobuhisa Yamaguchi It is certified that error appears in the above-identified patent and that said Letters Patent is hereby corrected as shown below:

In the Specification

Column 4, Line 45, after "correction", delete ".".

Column 9, Line 5, before "-frequency", delete "11:01" and insert --high--, therefor.

In the Claims

Column 12, Claim 5, Line 14, after "rectifier" delete "." and insert --,--, therefor.

Signed and Sealed this
Seventeenth Day of July, 2018

Andrei Iancu
*Director of the United States Patent and Trademark Office*